United States Patent
Tan

(10) Patent No.: US 12,216,933 B1
(45) Date of Patent: Feb. 4, 2025

(54) MEMORY MANAGEMENT METHOD, MEMORY STORAGE DEVICE, AND MEMORY CONTROL CIRCUIT UNIT

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 15 days.

(21) Appl. No.: 18/469,561

(22) Filed: Sep. 19, 2023

(30) Foreign Application Priority Data

Jul. 26, 2023 (TW) .................................. 112127893

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2018/0107614 A1* | 4/2018 | Hong | .................. | G06F 13/1642 |
| 2019/0146709 A1* | 5/2019 | Im | ......................... | G06F 3/0685 |
| | | | | 711/103 |
| 2020/0159434 A1* | 5/2020 | Walker | ..................... | G06F 3/068 |
| 2020/0159435 A1* | 5/2020 | Walker | ................... | G06F 3/0604 |
| 2020/0159436 A1* | 5/2020 | Walker | ................... | G06F 3/0656 |
| 2020/0159437 A1* | 5/2020 | Walker | ................... | G06F 3/0647 |
| 2022/0350529 A1* | 11/2022 | Kim | ...................... | G06F 3/0679 |
| 2023/0195362 A1* | 6/2023 | Bi | ........................ | G06F 3/0688 |
| | | | | 711/154 |

FOREIGN PATENT DOCUMENTS

TW      I581092      5/2017

OTHER PUBLICATIONS

"Office Action of Taiwan Counterpart Application", issued on Jul. 16, 2024, pp. 1-4.

* cited by examiner

*Primary Examiner* — Kevin Verbrugge
(74) *Attorney, Agent, or Firm* — JCIPRNET

(57) ABSTRACT

A memory management method, a memory storage device, and a memory control circuit unit are provided. The method includes establishing a connection between the memory storage device and a host system; receiving a first request from the host system via the connection; detecting a status of the memory storage device in a time range according to the first request; and determining whether to use a memory in the host system according to the status.

28 Claims, 8 Drawing Sheets

MEMORY MANAGEMENT METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 112127893, filed on Jul. 26, 2023. The entirety of the above-mentioned patent application is hereby incorporated by reference herein and made a part of this specification.

BACKGROUND

Technical Field

The disclosure relates to a memory management technology, and in particular to a memory management method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into various portable electronic devices exemplified above.

Certain types of memory storage devices support host memory buffering technology. In the architecture adopting the host memory buffering, the memory storage device may use the memory of the host system as the buffer of the memory storage device and may actively access the memory of the host system. For example, when the host system reads data from or writes data into the memory storage device, the management table required to access the memory storage device may be temporarily stored in the memory of the host system for the memory storage device to inquire or update the data content therein at any time. However, in certain cases, if the operating environment of the memory storage device is unstable, the memory storage device needs to repeatedly execute the startup operation of the host memory buffering in order to use the memory of the host system, thereby causing the operating stability of the memory storage device to decrease.

SUMMARY

The disclosure provides a memory management method, a memory storage device, and a memory control circuit unit, which can improve the operating stability of the memory storage device.

An exemplary embodiment of the disclosure provides a memory management method, which is used for a memory storage device. The memory management method includes the following steps. A connection between the memory storage device and a host system is established. A first request is received from the host system via the connection. A status of the memory storage device within a time range is detected according to the first request. Whether to use a memory in the host system is determined according to the status.

An exemplary embodiment of the disclosure also provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit is used to establish a connection between the memory storage device and the host system; receive a first request from the host system via the connection; detect a status of the memory storage device within a time range according to the first request; and determine whether to use a memory in the host system according to the status.

An exemplary embodiment of the disclosure also provides a memory control circuit unit, which is used to control a memory storage device. The memory storage device includes a rewritable non-volatile memory module. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used to establish a connection between the memory storage device and the host system; receive a first request from the host system via the connection; detect a status of the memory storage device within a time range according to the first request; and determine whether to use a memory in the host system according to the status.

An exemplary embodiment of the disclosure also provides a memory management method, which is used for a memory storage device. The memory management method includes the following steps. A connection between the memory storage device and a host system is established. A first request is received from the host system via the connection. A status of the memory storage device within a time range is detected according to the first request. Whether to enable the memory storage device to enter a low power consumption mode is determined according to the status.

An exemplary embodiment of the disclosure also provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit is used to establish a connection between the memory storage device and the host system; receive a first request from the host system via the connection; detect a status of the memory storage device within a time range according to the first request; and determine whether to enable the memory storage device to enter a low power consumption mode according to the status.

An exemplary embodiment of the disclosure also provides a memory control circuit unit, which is used to control a memory storage device. The memory storage device includes a rewritable non-volatile memory module. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used to establish a connection between the memory storage device and the host system; receive a first request from the host system via the connection; detect a status of the memory storage device within a time range according to the first request; and determine whether to enable the memory storage device to enter a low power consumption mode according to the status.

An exemplary embodiment of the disclosure also provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit is used to execute the following operations. A connection between the memory storage device and the host system is established. A first request is received from the host system via the connection. Whether at least one event occurs within a time range is detected according to the first request. The at least one event affects an execution effect of an operation instructed by the first request. Whether to execute the operation is determined according to a detection result.

Based on the above, after the connection between the memory storage device and the host system is established, the first request may be received from the host system via the connection. According to the first request, the status of the memory storage device within a time range may be continuously detected to determine whether to execute a specific operation. Thereby, the operating stability of the memory storage device can be improved.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data into the memory storage device or read data from the memory storage device.

Figure 1:
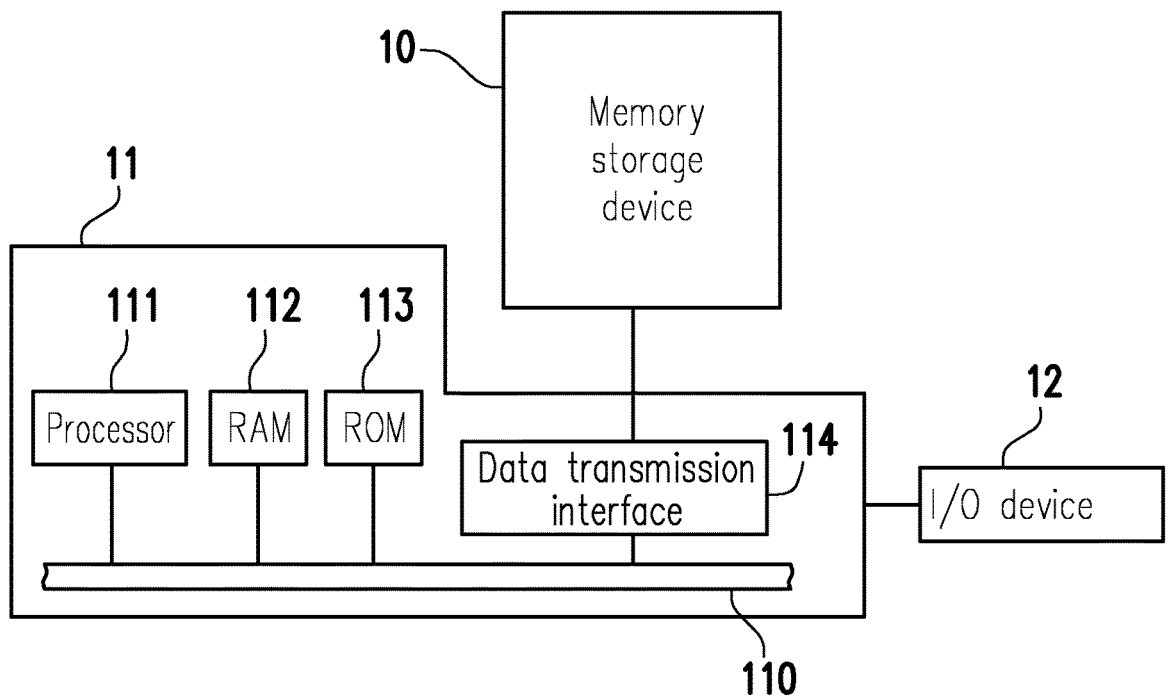
FIG. 1 is a schematic diagram of a host system, a memory storage device, and an input/output (I/O) device according to an exemplary embodiment of the disclosure.
Figure 2:
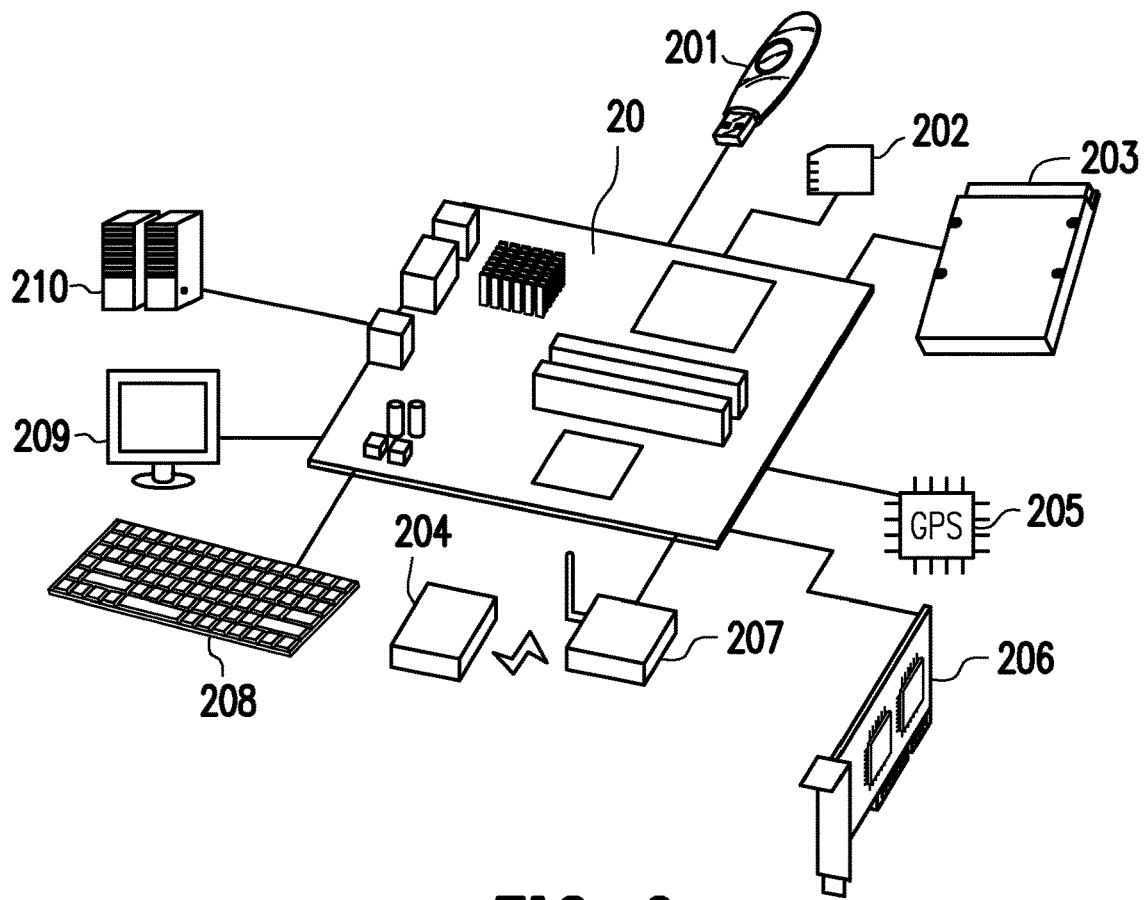
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data in the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may, for example, be a flash drive 201, a memory card 202, a solid state drive (SSD) 203, or a wireless memory storage device 204. The wireless memory storage device 204 may, for example, be a near field communication (NFC) memory storage device, a Wi-Fi memory storage device, a Bluetooth memory storage device, a low power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data.

Figure 3:
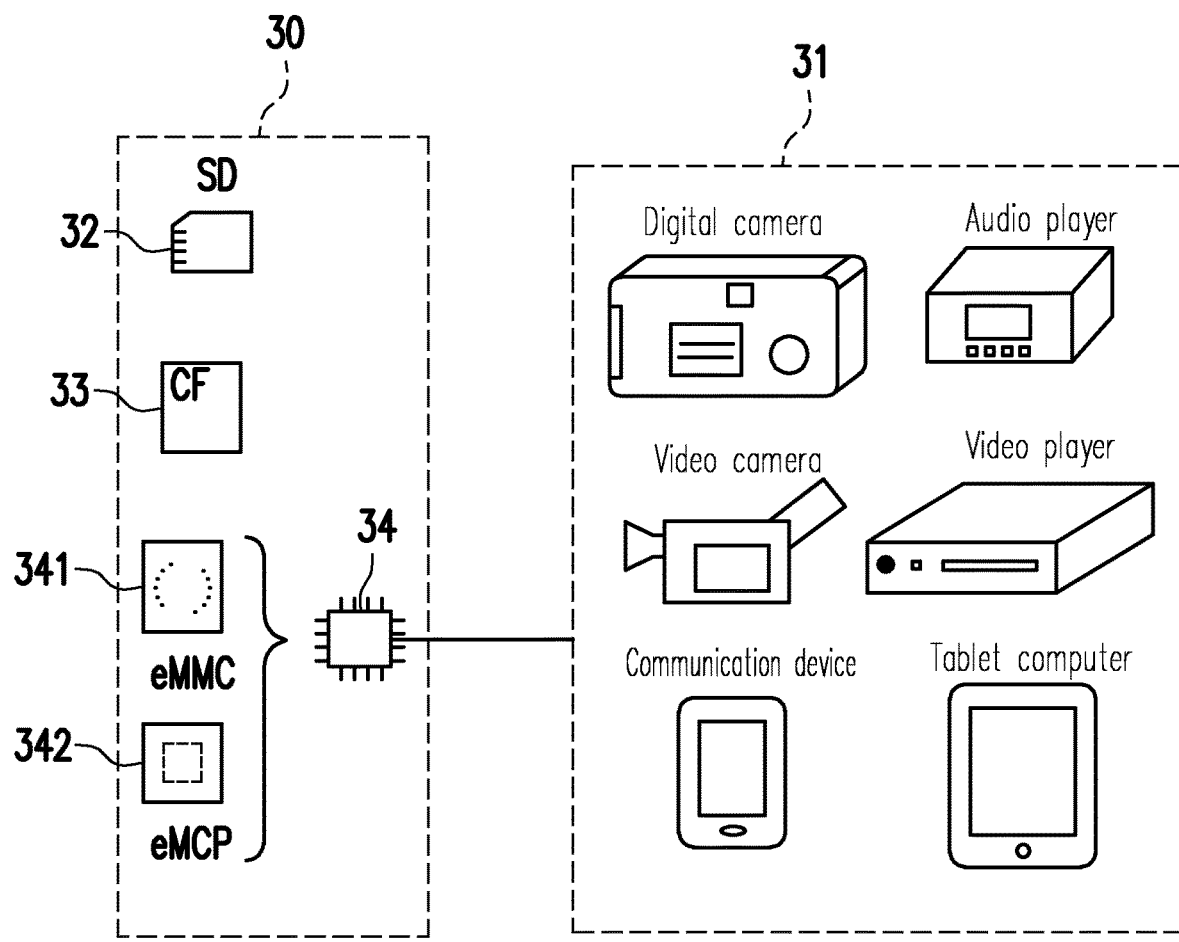
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. In an exemplary embodiment, a host system 31 may be a digital camera, a video camera, a communication device, an audio player, a video player, a tablet computer, or other systems. A memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
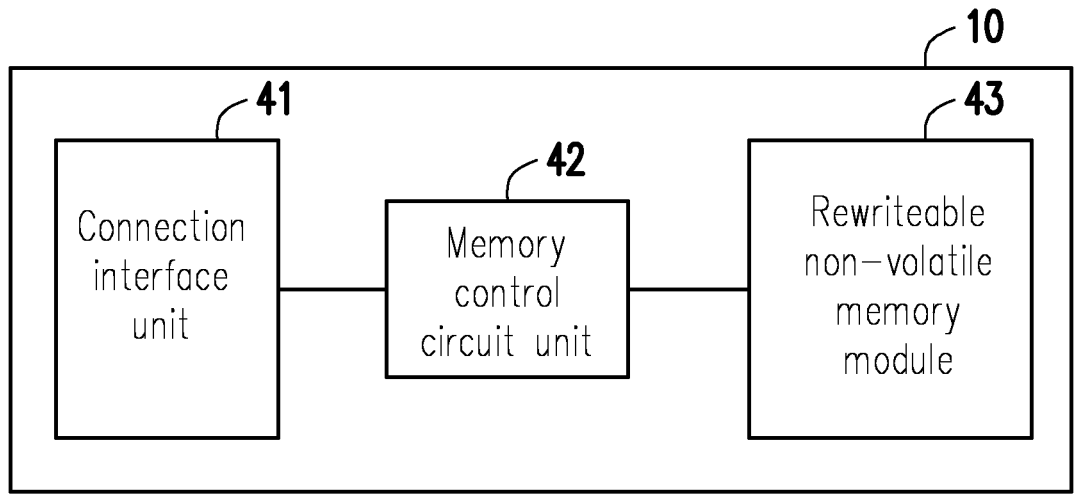
FIG. 4 is a schematic block diagram of a memory storage device according to an exemplary embodiment of the disclosure.

FIG. 4 is a schematic block diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If one memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is used to store system data (for example, management data such as an error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

Figure 5:
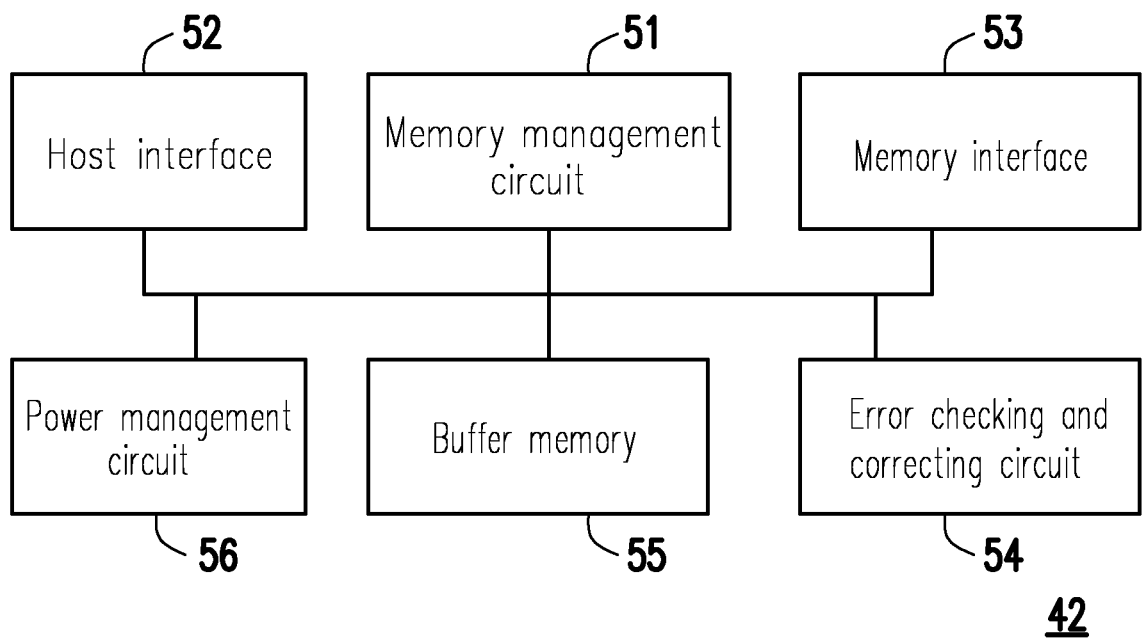
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific region (for example, a system area dedicated to storing the system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data into the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written into the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. In other words, data to be written into the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and the corresponding command sequences for instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute an error detecting and correcting operation to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code into the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 executes the error detecting and correcting operation on the read data according to the error correcting code and/or the error detecting code.

The buffer memory 55 is coupled to the memory management circuit 51 and is used to temporarily store data and commands from the host system 11 or data from the rewritable non-volatile memory module 43. The power management circuit 56 is coupled to the memory management circuit 51 and is used to control the power of the memory storage device 10.

In an exemplary embodiment, the memory storage device 10 of FIG. 4 is also referred to as a flash memory device, the rewritable non-volatile memory module 43 is also referred to as a flash memory module, and the memory control circuit unit 42 is also referred to as a flash memory controller for controlling the flash memory module. In an exemplary embodiment, the memory management circuit 51 of FIG. 5 is also referred to as a flash memory management circuit.

Figure 6:
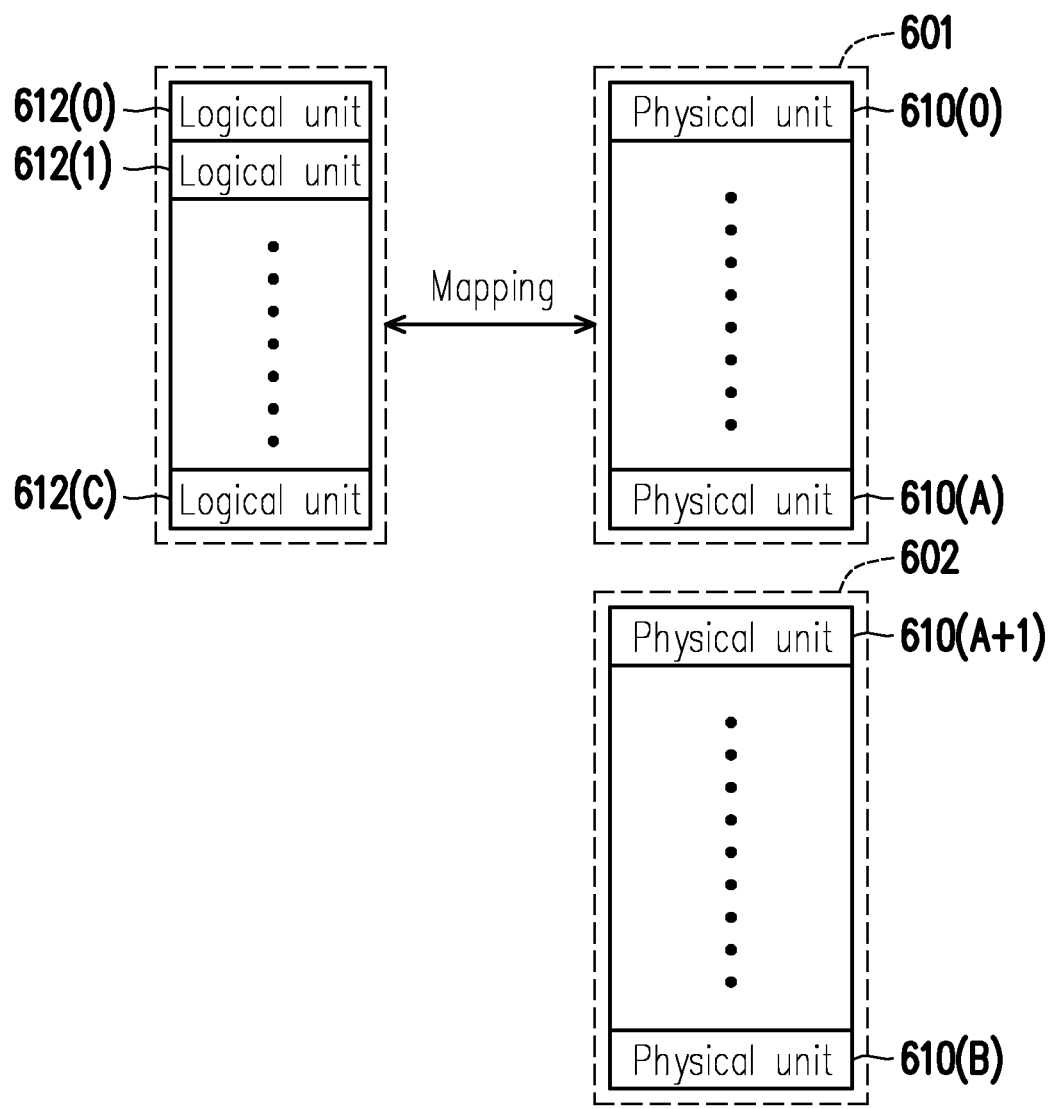
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a system area 602. Each physical unit may refer to a physical address, a physical programming unit, a physical erasing unit, or consist of multiple continuous or discontinuous physical addresses.

The physical units 610(0) to 610(A) in the storage area 601 are used to store user data (for example, the user data from the host system 11 of FIG. 1). For example, the physical units 610(0) to 610(A) in the storage area 601 may store valid data and invalid data. The physical units 610(A+1) to 610(B) in the system area 602 are used to store management data (also referred to as the system data). For example, the management data stored in the system area 602 may include a logical-to-physical (L2P) mapping table, a bad block management table, a device model, or other types of management data.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In another exemplary embodiment, one logical unit may also correspond to one logical programming unit, one logical erase unit, or consist of multiple continuous or discontinuous logical addresses. In addition, each logical unit may be mapped to one or more physical units. It should be noted that in an exemplary embodiment, the memory management circuit 51 may not be configured with logical units mapped to the system area 602, so as to prevent the management data stored in the system area 602 from being accidentally modified by the user.

The memory management circuit 51 may record management data (also referred to as logical-to-physical mapping information) describing a mapping relationship between the logical unit and the physical unit in at least one logical-to-physical mapping table. For example, the logical-to-physical mapping table may be stored in a physical unit of the system area 602. When the host system 11 intends to read data from the memory storage device 10 or write data into the memory storage device 10, the memory management circuit 51 may execute a data access operation on the memory storage device 10 according to the logical-to-physical mapping table.

Figure 7:
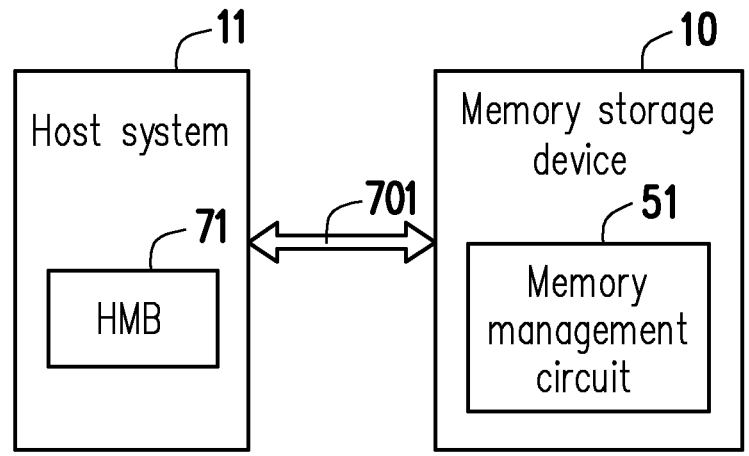
FIG. 7 is a schematic diagram of a host system and a memory storage device according to an exemplary embodiment of the disclosure.

FIG. 7 is a schematic diagram of a host system and a memory storage device according to an exemplary embodiment of the disclosure. In an exemplary embodiment, the memory management circuit 51 may establish a connection 701 between the memory storage device 10 and the host system 11. For example, the memory management circuit 51 may execute a handshake operation with the host system 11 to establish the connection 701. For example, in the handshake operation, the memory management circuit 51 and the host system 11 may execute clock correction, equalizer correction, and/or transmit handshake signals to each other, which is not limited by the disclosure.

After the connection 701 is established, the memory management circuit 51 may communicate with the host system 11 via the connection 701. In an exemplary embodiment, the connection 701 between the memory storage device 10 and the host system 11 conforms to the non-volatile memory express (NVM express, NVMe) specification. In an exemplary embodiment, the connection 701 may also comply with other specifications, which is not limited by the disclosure.

First Exemplary Embodiment

In the first exemplary embodiment, it is assumed that the host system 11 and the memory storage device 10 both support the host memory buffering technology. Under the host memory buffering architecture, the host system 11 may provide a memory 71 for the memory storage device 10 to use. The memory 71 is located inside host system 11. For example, the memory 71 may be installed on a motherboard inside the host system 11. For example, the memory 71 may include at least one random access memory and may be used to temporarily store data. It should be noted that the disclosure does not limit the total number, the capacity, and/or the type of the memory 71. In an exemplary embodiment, the memory 71 is also referred to as a host memory buffer (HMB).

In an exemplary embodiment, the memory management circuit 51 may receive a request (also referred to as a first request) from the host system 11 via the connection 701. The first request is used to enable host system buffering. For example, the first request may be used to ask whether the memory storage device 10 supports the host memory buffering. According to the first request, the memory management circuit 51 may detect a status of the memory storage device 10 within a preset time range. For example, the time length of the time range may be 5 seconds, 10 seconds, or other time lengths, which is not limited by the disclosure. According to the detected status of the memory storage device 10, the memory management circuit 51 may determine whether to use (for example, access) the memory 71 in the host system 11. Alternatively, from another point of view, according to the detected status of the memory storage device 10, the memory management circuit 51 may determine whether to enable the host system buffering.

In an exemplary embodiment, in response to the first request, the memory management circuit 51 may start a counter. An output value (also referred to as a count value) of the counter reflects how long has elapsed since the first request was received. After the counter is started, the memory management circuit 51 may judge whether the current time is within the time range or exceeds the time range according to the count value.

In an exemplary embodiment, in response to the first request, the memory management circuit 51 may obtain the status of the memory storage device 10 within the time range according to at least one of a received command record and a system environment record of the memory storage device 10. The received command record may record or reflect information of at least one command received by the memory storage device 10 from the host system 11 within the time range. For example, the received command record may record or reflect the type, the content, the number, the time of receipt, or other information related to the received command of the at least one command (or request) received by the memory storage device 10 from the host system 11 within the time range. The system environment record may record or reflect at least one system parameter (or environment parameter) detected by the memory storage device 10 within the time range. For example, the system parameter (or the environment parameter) may reflect that the memory storage device 10 is reset at a specific time point, a voltage of the memory storage device 10 at a specific time point, an abnormal status of the memory storage device 10 at a specific time point, etc. In an exemplary embodiment, the memory management circuit 51 may evaluate the status of the memory storage device 10 within the time range according to at least one of the received command record and the system environment record.

In an exemplary embodiment, according to a detection result, the memory management circuit 51 may judge whether a specific status of the memory storage device 10 occurs within the time range. In response to the specific status of the memory storage device 10 occurring within the time range, the memory management circuit 51 may determine not to use (or disable) the memory 71 in the host system 11. Alternatively, in response to the specific status of the memory storage device 10 not occurring within the time range, the memory management circuit 51 may allow using the memory 71 in the host system 11 after leaving the time range.

In an exemplary embodiment, the specific status may include that the memory storage device 10 is reset. For example, the memory storage device 10 being reset may include the memory storage device 10 being initialized or rebooted. For example, within the time range, if the memory management circuit 51 detects that the memory storage device 10 is reset, the memory management circuit 51 may determine not to use the memory 71 in the host system 11.

In an exemplary embodiment, the specific status may include voltage instability of the memory storage device 10. For example, the voltage instability of the memory storage device 10 may include the voltage deviation of the memory storage device 10 exceeding an allowable range. For example, within the time range, if the memory management circuit 51 detects the voltage instability of the memory storage device 10, the memory management circuit 51 may determine not to use the memory 71 in the host system 11.

In an exemplary embodiment, the specific status may include that the memory storage device 10 receives another request (also referred to as a second request) from the host system 11. The second request is used to disable the host system buffering. For example, within the time range, if the memory management circuit 51 detects the second request from the host system 11, the memory management circuit 51 may determine not to use the memory 71 in the host system 11.

In an exemplary embodiment, the specific status may include that the memory storage device 10 receives another request (also referred to as a third request) from the host system 11. The third request is used to instruct the memory storage device 10 to enter a low power consumption mode. For example, the low power consumption mode may include a power saving mode, a sleep mode, a hibernation mode, or a standby mode. The power consumption per unit time of the memory storage device 10 operating in the low power consumption mode may be less than the power consumption per unit time of the memory storage device 10 operating in a normal working mode. Taking multiple power statuses PS0 to PS4 of the memory storage device 10 as an example, the normal working mode may include the power status PS0, and the low power consumption mode may include the power statuses PS2 to PS4, and the disclosure is not limited thereto.

In an exemplary embodiment, after determining not to use the memory 71 in the host system 11, even if a request (that is, the first request) instructing to enable the host system buffering is previously received, the memory management circuit 51 may still ignore the request (that is, the first request) and not use the memory 71 in the host system 11. Thereby, in the case where the operating environment of the memory storage device 10 is unstable, the operating stability of the memory storage device 10 can be improved.

In an exemplary embodiment, in the case where the memory 71 in the host system 11 is allowed to be used, the memory management circuit 51 may provide a response to the host system 11 to respond to the first request. For example, the response may inform the host system 11 of useful information such as whether the memory storage device 10 supports the host memory buffering and/or a memory space required by the memory storage device 10. The host system 11 may configure the memory 71 according to the response for the memory storage device 10 to access.

In an exemplary embodiment, in the case where the memory 71 in the host system 11 is allowed to be used, the memory 71 may be used to replace at least part of the buffer memory (for example, the buffer memory 55 of FIG. 5) in the memory storage device 10 for the memory management circuit 51 to use. In an exemplary embodiment, in the case where the memory 71 in the host system 11 is allowed to be used, the memory 71 may be matched with at least part of the buffer memory (for example, the buffer memory 55 of FIG. 5) in the memory storage device 10 for the memory management circuit 51 to use. In an exemplary embodiment, the memory management circuit 51 may use the memory 71 and not use at least part of the buffer memory (for example, the buffer memory 55 of FIG. 5) in the memory storage device 10.

In an exemplary embodiment, in the case where the memory 71 in the host system 11 is allowed to be used, the memory management circuit 51 may access the memory 71 via the connection 701. For example, the memory management circuit 51 may read an operating command (for example, a read command, a write command, and/or an erase command) provided by the host system 11 from the memory 71 via the connection 701. In addition, the memory management circuit 51 may store data read from the rewritable non-volatile memory module 43 into the memory 71 or read data to be stored in the rewritable non-volatile memory module 43 from the memory 71 via the connection 701.

In an exemplary embodiment, the memory management circuit 51 may store the management data (for example, the logical-to-physical mapping information) read from the rewritable non-volatile memory module 43 in the memory 71. Thereafter, the memory management circuit 51 may inquire and/or update the management data in the memory 71. After updating the management data, the memory management circuit 51 may store the updated management data back in the rewritable non-volatile memory module 43.

In other words, in the first exemplary embodiment, in the case where the operating environment of the memory storage device 10 is relatively stable, the read and write performance of the memory storage device 10 can be improved by using the memory 71 in the host system 11. However, in the case where the operating environment of the memory storage device 10 is relatively unstable, the operating stability of the memory storage device 10 can be improved through not using (or disabling) the memory 71 in the host system 11.

Second Exemplary Embodiment

In the second exemplary embodiment, the memory management circuit 51 may receive a request (also referred to as a first request) from the host system 11 via the connection 701. The first request is used to instruct the memory storage device 10 to enter the low power consumption mode. For example, the low power consumption mode may include a power saving mode, a sleep mode, a hibernation mode, or a standby mode. The power consumption per unit time of the memory storage device 10 operating in the low power consumption mode may be less than the power consumption per unit time of the memory storage device 10 operating in the normal working mode. Taking the power statuses PS0 to PS4 of the memory storage device 10 as an example, the normal working mode may include the power status PS0, and the low power consumption mode may include the power statuses PS2 to PS4, and the disclosure is not limited thereto.

According to the first request, the memory management circuit 51 may detect the status of the memory storage device 10 within a preset time range. For example, the time length of this time range may be 5 seconds, 10 seconds, or other time lengths, which is not limited by the disclosure. According to the detected status of the memory storage device 10, the memory management circuit 51 may determine whether to enable (or allow) the memory storage device 10 to enter the low power consumption mode.

In an exemplary embodiment, in response to the first request, the memory management circuit 51 may obtain the status of the memory storage device 10 within the time range according to the received command record of the memory storage device 10. The received command record may record or reflect the information of at least one command received by the memory storage device 10 from the host system 11 within the time range. For example, the received command record may record or reflect the type, the content, the number, the time of receipt, or other information related to the received command of the at least one command (or request) received by the memory storage device 10 from the host system 11 within the time range. In an exemplary embodiment, the memory management circuit 51 may evaluate the status of the memory storage device 10 within the time range according to the received command record.

In an exemplary embodiment, according to the detection result, the memory management circuit 51 may judge whether the memory storage device 10 receives another request (also referred to as a second request) within the time range. The second request is used to wake up the memory storage device 10. For example, waking up the memory storage device 10 may include restoring the memory storage device 10 from the low power consumption mode to the normal working mode.

In response to the memory storage device 10 receiving the second request within the time range, the memory management circuit 51 may not enable (for example, not allow) the memory storage device 10 to enter the low power consumption mode (that is, the memory storage device 10 is maintained in a normal operating mode). Alternatively, in response to the memory storage device 10 not receiving the second request within the time range, the memory management circuit 51 may control (or allow) the memory storage device 10 to enter the low power consumption mode after leaving the time range.

In an exemplary embodiment, after determining not to enable the memory storage device 10 to enter the low power consumption mode, even if the request instructing the memory storage device 10 to enter the low power consumption mode (that is, the first request) is previously received, the memory management circuit 51 may still ignore the request (that is, the first request) and not enable the memory storage device 10 to enter the low power consumption mode. Thereby, in the case where the operating environment of the memory storage device 10 is unstable, the operating stability of the memory storage device 10 can be improved. In addition, in the case where the operating environment of the memory storage device 10 is relatively stable, enabling the memory storage device 10 to enter the low power consumption mode can reduce the power consumption per unit time of the memory storage device 10.

It should be noted that in the second exemplary embodiment, the memory storage device 10 and/or the host system 11 may or may not support the host memory buffering mentioned in the first exemplary embodiment, which is not limited by the disclosure. In addition, the first exemplary embodiment and the second exemplary embodiment may be implemented together or respectively implemented independently, which is not limited by the disclosure.

Third Exemplary Embodiment

In the third exemplary embodiment, the memory management circuit 51 may receive a request (also referred to as a first request) from the host system 11 via the connection 701. For example, the first request may include the request for enabling the host system buffering and/or instructing the memory storage device 10 to enter the low power consumption mode. In addition, the first request may also be used to instruct the memory storage device 10 to execute other types of operations, which is not limited by the disclosure. According to the first request, the memory management circuit 51 may detect whether at least one event occurs within a time range. In particular, the at least one event affects an execution effect of an operation instructed by the first request. For example, the memory management circuit 51 may judge whether the at least one event occurs within the time range according to the received command record (and the system environment record) of the memory storage device 10. Then, the memory management circuit 51 may determine whether to execute the operation instructed by the first request according to the detection result.

In an exemplary embodiment, assuming that the first request is the request for enabling the host system buffering, the at least one event may include the memory storage device 10 being reset, the voltage instability of the memory storage device 10, the memory storage device 10 receiving a request for disabling the host system buffering from the host system 11, and/or the memory storage device 10 receiving the request instructing the memory storage device 10 to enter the low power consumption mode from the host system 11. After the memory management circuit 51 enables the host system buffering according to the first request, within the time range, the event may cause the host system buffering to be turned off again or repeatedly turned on and off within a short time, thereby causing a waste of system resources (equivalent to affecting the execution effect of the operation instructed by the first request).

In an exemplary embodiment, assuming that the first request is the request for instructing the memory storage device 10 to enter the low power consumption mode, the at least one event may include a request for waking up the memory storage device 10. After the memory management circuit 51 controls the memory storage device 10 to enter the low power consumption mode according to the first request, within the time range, the event may cause the memory storage device 10 to be waken up again within a short time, thereby causing a waste of system resources (equivalent to affecting the execution effect of the operation instructed by the first request).

In an exemplary embodiment, if the detection result reflects that the at least one event does not occur within the time range, the memory management circuit 51 may allow the operation instructed by the first request to be executed, such as enabling the host system buffering or controlling the memory storage device 10 to enter the low power consumption mode. However, if the detection result reflects that the at least one event occurs within the time range, the memory management circuit 51 may not allow the operation instructed by the first request to be executed. In this way, the waste of system resources can be reduced and/or the operation instructed by the first request can be executed at the most appropriate time point.

Figure 8:
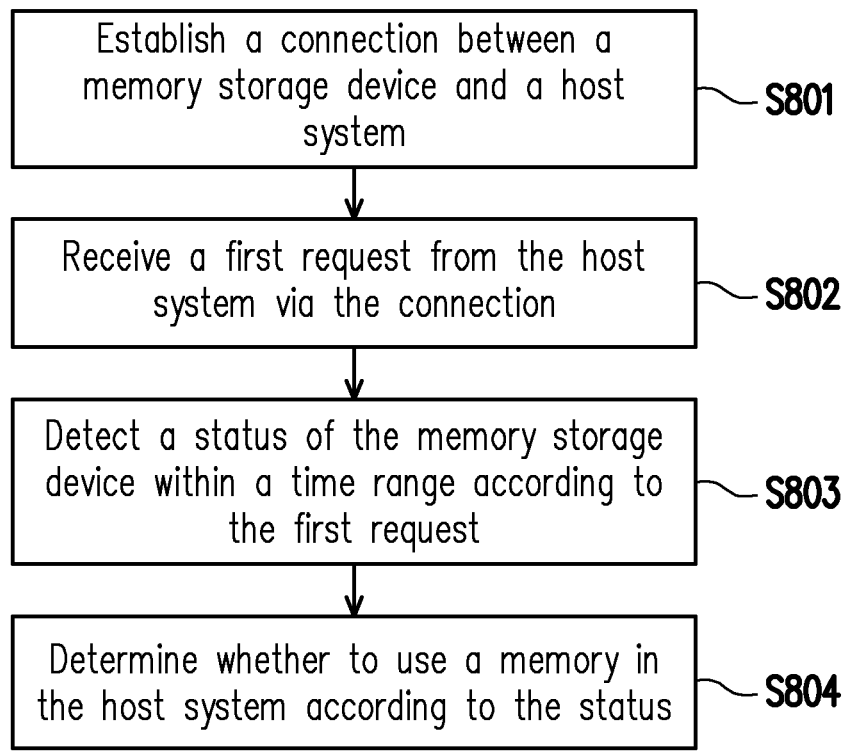
FIG. 8 is a flowchart of a memory management method according to a first exemplary embodiment of the disclosure.

FIG. 8 is a flowchart of a memory management method according to the first exemplary embodiment of the disclosure. Please refer to FIG. 8. In Step S801, a connection between a memory storage device and a host system is established. In Step S802, a first request is received from the host system via the connection. In Step S803, a status of the memory storage device within a time range is detected according to the first request. In Step S804, whether to use a memory in the host system is determined according to the status.

Figure 9:
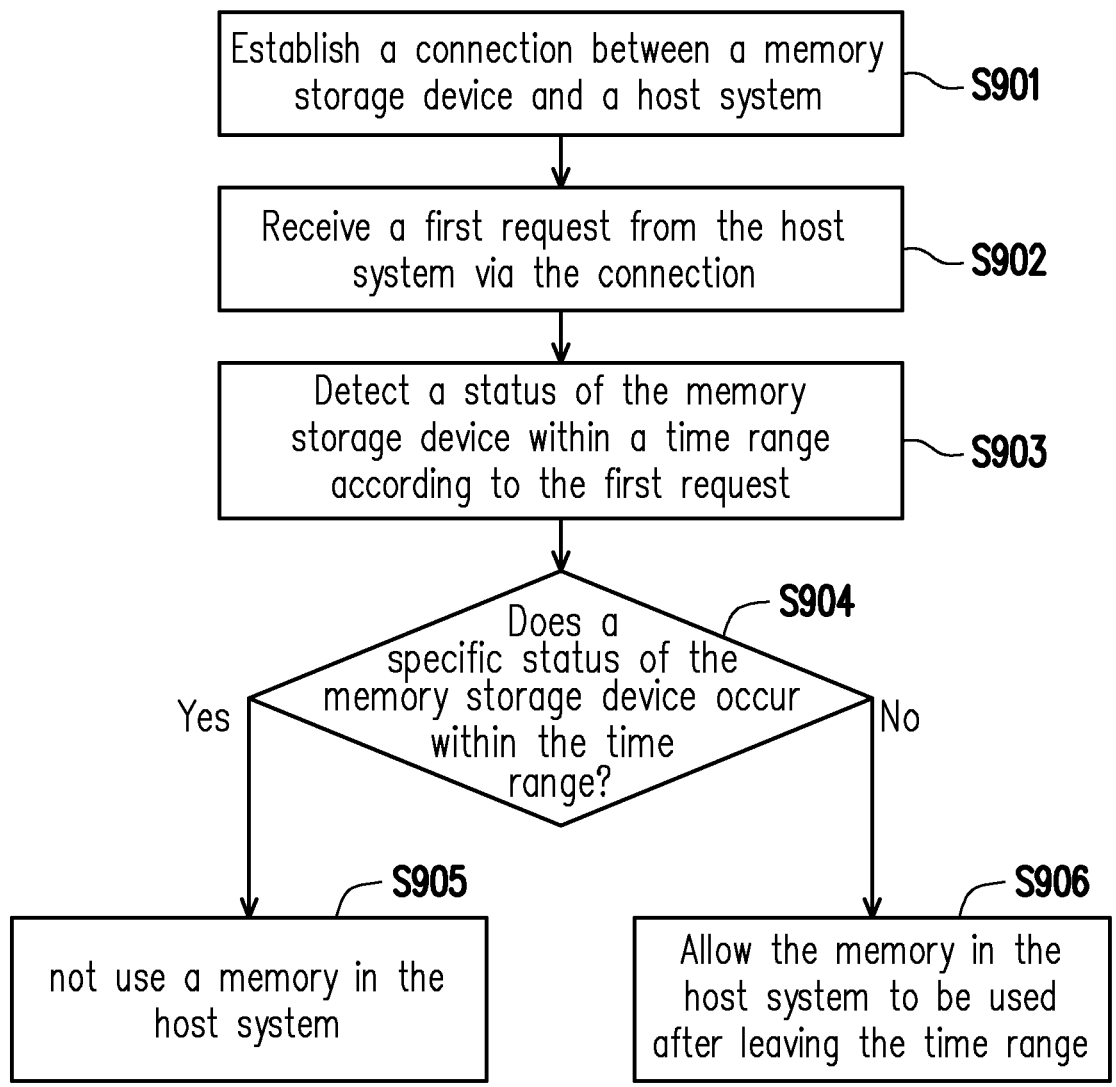
FIG. 9 is a flowchart of a memory management method according to the first exemplary embodiment of the disclosure.

FIG. 9 is a flowchart of a memory management method according to the first exemplary embodiment of the disclosure. Please refer to FIG. 9. In Step S901, a connection between a memory storage device and a host system is established. In Step S902, a first request is received from the host system via the connection. In Step S903, a status of the memory storage device within a time range is detected according to the first request. In Step S904, whether a specific status of the memory storage device occurs within the time range is judged. If the specific status of the memory storage device occurs within the time range, in Step S905, a memory in the host system is not used. However, if the specific status of the memory storage device does not occur within the time range, in Step S906, the memory in the host system is allowed to be used after leaving the time range.

Figure 10:
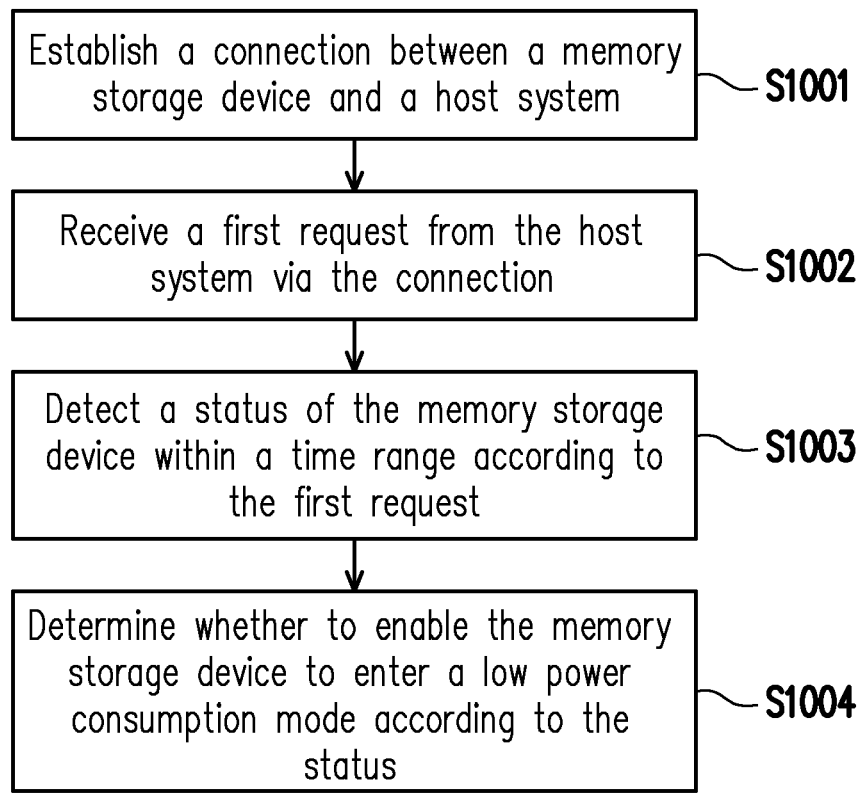
FIG. 10 is a flowchart of a memory management method according to a second exemplary embodiment of the disclosure.

FIG. 10 is a flowchart of a memory management method according to the second exemplary embodiment of the disclosure. Please refer to FIG. 10. In Step S1001, a connection between a memory storage device and a host system is established. In Step S1002, a first request is received from the host system via the connection. In Step S1003, a status of the memory storage device within a time range is detected according to the first request. In Step S1004, whether to enable the memory storage device to enter a low power consumption mode is determined according to the status.

Figure 11:
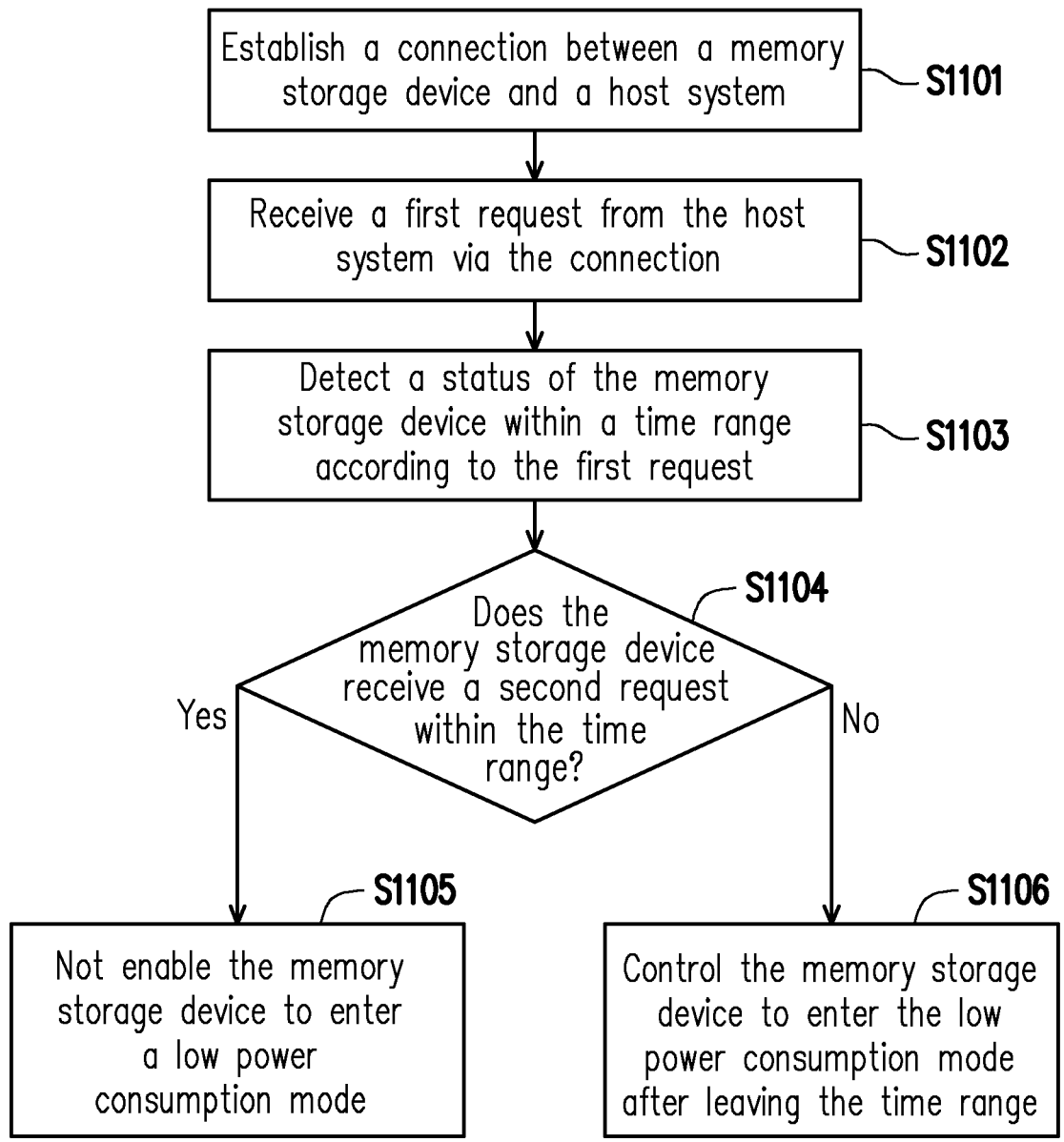
FIG. 11 is a flowchart of the memory management method according to the second exemplary embodiment of the disclosure.

FIG. 11 is a flowchart of a memory management method according to the second exemplary embodiment of the disclosure. Please refer to FIG. 11. In Step S1101, a connection between a memory storage device and a host system is established. In Step S1102, a first request is received from the host system via the connection. In Step S1103, a status of the memory storage device within a time range is detected according to the first request. In Step S1104, whether the memory storage device receives a second request within the time range is judged. If the memory storage device receives the second request within the time range, in Step S1005, the memory storage device is not enabled to enter a low power consumption mode. However, if the memory storage device does not receive the second request within the time range, in Step S1006, the memory storage device is controlled to enter the low power consumption mode after leaving the time range.

However, each step in FIG. 8 to FIG. 11 has been described in detail above and will not be repeated here. It should be noted that each step in FIG. 8 to FIG. 11 may be implemented as multiple program codes or circuits, which is not limited by the disclosure. In addition, the methods of FIG. 8 to FIG. 11 may be used together with the above exemplary embodiments or may be used alone, which is not limited by the disclosure.

In summary, in the exemplary embodiments of the disclosure, whether to execute a specific operation, such as using the memory in the host system (that is, enabling the host system buffering) or enabling the memory storage device to enter the low power consumption mode, may be determined according to the status of the memory storage device within the preset time range after receiving the first request from the host system. In this way, the operating stability of the memory storage device can be improved in the case where the operating environment is relatively unstable.

Although the disclosure has been disclosed above with the embodiments, it is not intended to limit the disclosure. Anyone with ordinary knowledge in the technical field may make some changes and modifications without departing from the spirit and scope of the disclosure. The scope of protection of the disclosure should be defined by the scope of the appended patent application.

What is claimed is:

1. A memory management method for a memory storage device, the memory management method comprising:
  establishing a connection between the memory storage device and a host system;
  receiving a first request from the host system via the connection;
  detecting a status of the memory storage device within a time range according to the first request; and
  determining whether to use a memory in the host system according to the status.

2. The memory management method according to claim 1, wherein the first request is used to enable host system buffering.

3. The memory management method according to claim 1, wherein the step of detecting the status of the memory storage device within the time range comprises:
  obtaining the status of the memory storage device within the time range according to at least one of a received command record and a system environment record of the memory storage device.

4. The memory management method according to claim 1, wherein the step of determining whether to use the memory in the host system according to the status comprises:
  not using the memory in the host system in response to a specified status of the memory storage device occurring within the time range; and
  allowing the memory in the host system to be used after leaving the time range in response to the specified status of the memory storage device not occurring within the time range.

5. The memory management method according to claim 4, wherein the specific status comprises at least one of a plurality of statuses of:
  the memory storage device being reset;
  a voltage deviation of the memory storage device exceeding an allowable range;
  the memory storage device receiving a second request from the host system, wherein the second request is used to disable host system buffering; and
  the memory storage device receiving a third request from the host system, wherein the third request is used to instruct the memory storage device to enter a low power consumption mode.

6. A memory storage device, comprising:
a connection interface unit, used to couple to a host system;
a rewritable non-volatile memory module; and
a memory control circuit unit, coupled to the connection interface unit and the rewritable non-volatile memory module,
wherein the memory control circuit unit is used to:
establish a connection between the memory storage device and the host system;
receive a first request from the host system via the connection;
detect a status of the memory storage device within a time range according to the first request; and
determine whether to use a memory in the host system according to the status.

7. The memory storage device according to claim 6, wherein the first request is used to enable host system buffering.

8. The memory storage device according to claim 6, wherein the operation of the memory control circuit unit detecting the status of the memory storage device within the time range comprises:
obtaining the status of the memory storage device within the time range according to at least one of a received command record and a system environment record of the memory storage device.

9. The memory storage device according to claim 6, wherein the operation of the memory control circuit unit determining whether to use the memory in the host system according to the status comprises:
not using the memory in the host system in response to a specified status of the memory storage device occurring within the time range; and
allowing the memory in the host system to be used after leaving the time range in response to the specified status of the memory storage device not occurring within the time range.

10. The memory storage device according to claim 9, wherein the specific status comprises at least one of a plurality of statuses of:
the memory storage device being reset;
a voltage deviation of the memory storage device exceeding an allowable range;
the memory storage device receiving a second request from the host system, wherein the second request is used to disable host system buffering; and
the memory storage device receiving a third request from the host system, wherein the third request is used to instruct the memory storage device to enter a low power consumption mode.

11. A memory control circuit unit for controlling a memory storage device, wherein the memory storage device comprises a rewritable non-volatile memory module, the memory control circuit unit comprising:
a host interface, used to couple to a host system;
a memory interface, used to couple to the rewritable non-volatile memory module; and
a memory management circuit, coupled to the host interface and the memory interface,
wherein the memory management circuit is used to:
establish a connection between the memory storage device and the host system;
receive a first request from the host system via the connection;
detect a status of the memory storage device within a time range according to the first request; and
determine whether to use a memory in the host system according to the status.

12. The memory control circuit unit according to claim 11, wherein the first request is used to enable host system buffering.

13. The memory control circuit unit according to claim 11, wherein the operation of the memory management circuit detecting the status of the memory storage device within the time range comprises:
obtaining the status of the memory storage device within the time range according to at least one of a received command record and a system environment record of the memory storage device.

14. The memory control circuit unit according to claim 11, wherein the operation of the memory management circuit determining whether to use the memory in the host system according to the status comprises:
not using the memory in the host system in response to a specified status of the memory storage device occurring within the time range; and
allowing the memory in the host system to be used after leaving the time range in response to the specified status of the memory storage device not occurring within the time range.

15. The memory control circuit unit according to claim 14, wherein the specific status comprises at least one of a plurality of statuses of:
the memory storage device being reset;
a voltage deviation of the memory storage device exceeding an allowable range;
the memory storage device receiving a second request from the host system, wherein the second request is used to disable host system buffering; and
the memory storage device receiving a third request from the host system, wherein the third request is used to instruct the memory storage device to enter a low power consumption mode.

16. A memory management method for a memory storage device, the memory management method comprising:
establishing a connection between the memory storage device and a host system;
receiving a first request from the host system via the connection;
detecting a status of the memory storage device within a time range according to the first request; and
determining whether to enable the memory storage device to enter a low power consumption mode according to the status.

17. The memory management method according to claim 16, wherein the first request is used to instruct the memory storage device to enter the low power consumption mode.

18. The memory management method according to claim 16, wherein the step of detecting the status of the memory storage device within the time range comprises:
obtaining the status of the memory storage device within the time range according to a received command record of the memory storage device.

19. The memory management method according to claim 16, wherein the step of determining whether to enable the memory storage device to enter the low power consumption mode according to the status comprises:
not enabling the memory storage device to enter the low power consumption mode in response to the memory storage device receiving a second request within the time range, wherein the second request is used to wake up the memory storage device; and controlling the memory storage device to enter the low power consumption mode after leaving the time range in response to the memory storage device not receiving the second request within the time range.

20. A memory storage device, comprising:
a connection interface unit, used to couple to a host system;
a rewritable non-volatile memory module; and
a memory control circuit unit, coupled to the connection interface unit and the rewritable non-volatile memory module,
wherein the memory control circuit unit is used to:
 establish a connection between the memory storage device and the host system;
 receive a first request from the host system via the connection;
 detect a status of the memory storage device within a time range according to the first request; and
 determine whether to enable the memory storage device to enter a low power consumption mode according to the status.

21. The memory storage device according to claim 20, wherein the first request is used to instruct the memory storage device to enter the low power consumption mode.

22. The memory storage device according to claim 20, wherein the operation of the memory control circuit unit detecting the status of the memory storage device within the time range comprises:
 obtaining the status of the memory storage device within the time range according to a received command record of the memory storage device.

23. The memory storage device according to claim 20, wherein the operation of the memory control circuit unit determining whether to enable the memory storage device to enter the low power consumption mode according to the status comprises:
 not enabling the memory storage device to enter the low power consumption mode in response to the memory storage device receiving a second request within the time range, wherein the second request is used to wake up the memory storage device; and
 controlling the memory storage device to enter the low power consumption mode after leaving the time range in response to the memory storage device not receiving the second request within the time range.

24. A memory control circuit unit for controlling a memory storage device, wherein the memory storage device comprises a rewritable non-volatile memory module, the memory control circuit unit comprising:
a host interface, used to couple to a host system;
a memory interface, used to couple to the rewritable non-volatile memory module; and
a memory management circuit, coupled to the host interface and the memory interface,
wherein the memory management circuit is used to:
 establish a connection between the memory storage device and the host system;
 receive a first request from the host system via the connection;
 detect a status of the memory storage device within a time range according to the first request; and
 determine whether to enable the memory storage device to enter a low power consumption mode according to the status.

25. The memory control circuit unit according to claim 24, wherein the first request is used to instruct the memory storage device to enter the low power consumption mode.

26. The memory control circuit unit according to claim 24, wherein the operation of the memory management circuit detecting the status of the memory storage device within the time range comprises:
 obtaining the status of the memory storage device within the time range according to a received command record of the memory storage device.

27. The memory control circuit unit according to claim 24, wherein the operation of the memory management circuit determining whether to enable the memory storage device to enter the low power consumption mode according to the status comprises:
 not enabling the memory storage device to enter the low power consumption mode in response to the memory storage device receiving a second request within the time range, wherein the second request is used to wake up the memory storage device; and
 controlling the memory storage device to enter the low power consumption mode after leaving the time range in response to the memory storage device not receiving the second request within the time range.

28. A memory storage device, comprising:
a connection interface unit, used to couple to a host system;
a rewritable non-volatile memory module; and
a memory control circuit unit, coupled to the connection interface unit and the rewritable non-volatile memory module,
wherein the memory control circuit unit is used to:
 establish a connection between the memory storage device and the host system;
 receive a first request from the host system via the connection;
 detect whether at least one event occurs within a time range according to the first request, wherein the at least one event affects an execution effect of an operation instructed by the first request; and
 determine whether to execute the operation according to a detection result.

* * * * *